No. 609,274. Patented Aug. 16, 1898.
E. R. GILL.
SYSTEM OF CONTROL OF ELECTRIC MOTORS.
(Application filed Apr. 4, 1898.)
(No Model.)
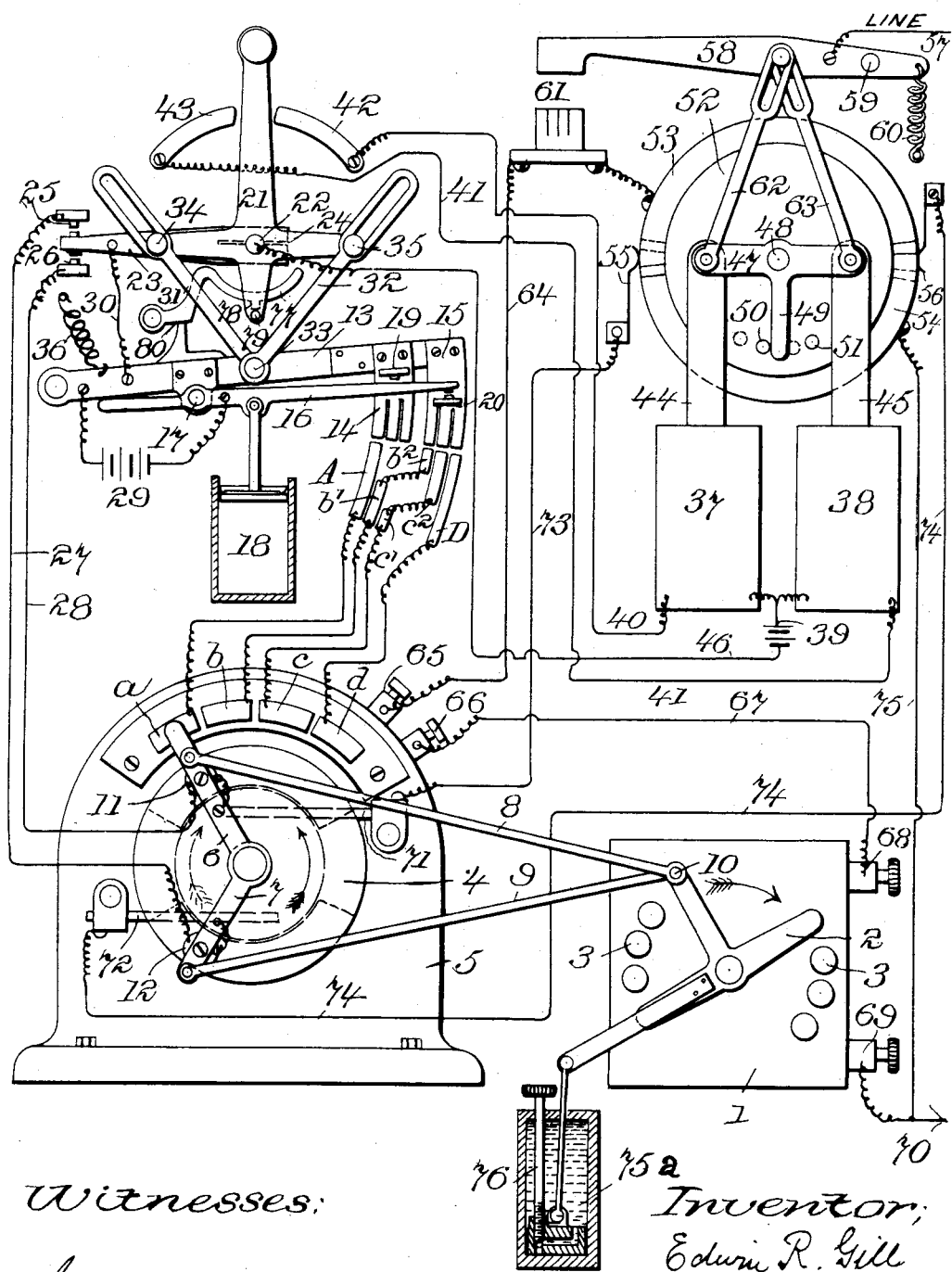
Witnesses:
Geo. D. Beattys
W. H. Pumphrey
Inventor:
Edwin R. Gill
by H. S. MacKaye
his Attorney.

UNITED STATES PATENT OFFICE.

EDWIN R. GILL, OF ENGLEWOOD, NEW JERSEY, ASSIGNOR TO THE INVENTION DEVELOPING COMPANY, OF NEW JERSEY.

SYSTEM OF CONTROL OF ELECTRIC MOTORS.

SPECIFICATION forming part of Letters Patent No. 609,274, dated August 16, 1898.

Application filed April 4, 1898. Serial No. 676,274. (No model.)

*To all whom it may concern:*

Be it known that I, EDWIN R. GILL, a citizen of the United States, residing at Englewood, in the county of Bergen and State of New Jersey, have invented a certain new and useful Improvement in Systems of Control of Electric Motors, of which the following is a specification.

My invention has particular relation to the control of electrically-driven railway-cars, trains, and elevators, but in its broadest aspects is applicable as well to the control of any form of motor, electric or otherwise or whether locomotive or stationary.

The combination of all the various details of my invention in its most specific form involves a number of special advantages, and I shall therefore proceed to describe in detail one form of my specific invention, at the same time pointing out the broader elements of novelty which I intend to claim herein.

One object of one principal form of my invention is the provision of a system of electrical control for motors whereby the power regulation is primarily dependent upon movement of the motor itself, thus insuring any desired degree of generation of counter electromotive force before a predetermined resistance has been cut out.

My invention further provides a system of control for motors whereby a plurality of distributed motors may be controlled simultaneously from a single manipulator or from a number of different points at will.

Another object of my invention is the provision of actuating means for the rheostat or other power-regulator of such a nature as to permit of reliable adjustment of the maximum rapidity of the changes produced independently of the operator by whom the control is manipulated. This is important in railway and elevator work in preventing the disagreeable jerks and shocks so often experienced where the rapidity of the power changes depends entirely upon the motorman. By the use of my improved system the changes of power may be made as gradual as desired; but the desired limit of suddenness can be fixed once for all by adjustment in the shops.

My invention has the advantage of enabling an operator to control a motor or motors at a distance and to regulate the speed or power produced at all times by the actual position of the manipulator-handle independently of the time the handle occupies any given position.

Another object of my invention is the provision of means whereby a circuit may be closed and reversed by the same agency and at the same time all danger of sparking at the reverser may be obviated by providing for its operation while the circuit is open.

The accompanying drawing is a diagrammatic representation of the various mechanisms and circuits preferably used in one form of my invention, including all its details and showing all the parts in their proper electrical relation to each other.

In the drawing the motor to be controlled is an electric motor whether for alternating or direct current, and the power-regulator is shown at 1 as a rheostat or other well-known means for regulating the amount of current or potential on the motor or one of its elements for varying its power or speed. It will be understood, however, that my invention is applicable to steam or other engines or motors and that the term "power-regulator" used in my specification and claims is broad enough to include a valve for steam or air, or, indeed, any well-known mechanism whereby the power of an engine or motor is regulated. It is also to be understood that while I have shown in the drawing an electric motor moving its own power-regulator one preferred form of my invention includes the use of an auxiliary motor, electric or otherwise, for moving the regulator and attached devices. This auxiliary motor may be running continuously or be impelled only when used, as desired.

The power-regulator in the form shown is to be distinguished from the current-director shown in the upper left-hand corner of my drawing and described fully hereinafter. The specific form of power-regulator shown in my drawing comprises a movable contact-arm 2, of any desired construction, coöperating with contacts 3 in a manner well understood in the art for the regulation of current. This regulator is one element in that portion of my system which I denominate the "power-controller," the other elements of which are the "controlling-actuator," whereby the movement of the regulator is caused, the "engager," whereby the regulator is brought into operative relation with the actuator, and the "engagement-interrupter," whereby the movement of the regulator is divided into steps the number of which is governed by the operator.

The controlling-actuator in the form shown is the disk 4, which is adapted to turn in unison with the motor or engine to be controlled. This dependence of movement is secured in the form shown by mounting the disk 4 upon the same shaft with the motor 5; but it is to be understood that this branch of my invention covers any means whereby the disk 4 moves with the motor controlled. Indeed, by various methods of mechanical connection and adjustment the controlling-actuator may be made to operate at any desired speed independently of the absolute speed of the motor. At the same time for any given adjustment the controlling-actuator varies its speed proportionally with the motor controlled.

Although the drawing shows the motor 5 regulated by the resistance-box 1, it is consistent with my broad invention that 5 should be a mere auxiliary motor separate from the main motor to be controlled. Indeed, clockwork or any other convenient motor would do in this connection. Where this form of my invention is employed, the circuit-closing means shown in the upper right-hand corner of my drawing may be dispensed with.

In order to transmit motion from the controlling-actuator to the power-regulator, I prefer to employ the form of engager shown or its equivalent, wherein two motive levers 6 and 7 are pivoted in front of the disk 4, the outer ends of said levers being connected by two connecting-bars 8 and 9 to a common point on the movable part of the regulator, as at 10. By virtue of this construction the movement of either motive lever 6 or 7 to the right or left will be accompanied by a movement in the same direction of the other motive lever.

It is further evident that since the upper and lower halves of the disk 4 must move in opposite directions when said disk revolves engagement of the motive lever 6 with said disk while revolving in a given direction will produce movement of the point 10 opposite to that which would be produced by engagement of the motive lever 7 with said disk. It is therefore evident that in order to cause the movement of the motor 5 to accomplish movement of the regulator contact-bar 2 in one or the other direction at will all that is necessary is to provide means whereby one or the other motive lever 6 or 7 may be brought into engagement with the controlling-actuator 4, as desired. For this purpose my preferred engager comprises an electromagnet upon each motive lever, as at 11 and 12, so mounted that when either of such magnets is energized it will be attracted against the disk 4, and friction will thus be set up sufficient to cause movement of the arm 2 on the power-regulator. It will be seen that if the disk 4 is revolving in the direction of the arrow shown in full lines thereon and the magnet 12 is so energized as to cause it to stick to said disk or otherwise to follow its movement the point 10 will be pushed over in the direction shown by the arrow on the regulator 1. If, on the contrary, the magnet 11 is energized, the opposite movement will be produced upon the regulator.

The construction whereby the magnets are made to engage with the disk upon being energized will be well understood without further illustration. Attraction of the magnets for the disk 4 is preferably produced by making said disk of iron or its equivalent; but my invention is not limited to this construction, as a diamagnetic disk of sufficient friction might be used, with a ring or disk of iron or its equivalent behind it, to which the magnets would be attracted; neither am I limited to the location of magnets relative to the disk, as shown.

My invention is not limited to the use of two magnets for actuation of the regulator from the motor regulated, but covers as well the use of a single magnet. Such a magnet might be used with a regulator which cut out resistance or otherwise increased the power delivered to the motor during movement through the first half-circle and then operated during the remaining half-circle to cut in resistance. In such a case, with a motor running in either direction, a single magnet would be operative in connection with a proper engagement-interrupter and complementary devices made on the principles hereinafter set forth.

It is to be further understood that my invention in its broader aspects covers in this connection the use of any means whereby engagement of a motive lever 6 or 7 with the controlling-actuator may be accomplished. Where such engagement is secured by means of electromagnets, they may act by friction and magnetic adherence, as shown, or by positive engagement in any well-known manner without departing from my invention. My invention is also broad enough to cover any means whereby the magnets when in engagement are made to operate a power-regulator.

In order to permit of the engagement between the controlling-actuator and the regulator being governed at will, it is necessary to provide means whereby the engagement may be interrupted at proper points. This may be accomplished either automatically or otherwise without departing from my invention; but I prefer to use automatic means for this purpose which at the same time that they interrupt an engagement already produced prepare for further engagement when desired. For this purpose I lead the circuit which actuates the magnets 11 and 12 to a series of switch-contacts, as $a\ b\ c\ d$, which comprise the specific form of engagement-interrupter shown in the drawing. The movable part of the switch which coöperates with the contacts $a\ b\ c\ d$ is made to move in unison with the motive levers 6 and 7 in any desired way and at any desired relative speed. I prefer the form shown, wherein one of the motive levers carries the movable contact. In the drawing the movable contact is at the end of the motive lever 6, which as it moves when in engagement with the disk 4 rides over the contacts $a\ b\ c\ d$.

Having thus described one preferred form of power-controller as used in accordance with my invention, I shall proceed to the description of the manipulator which I prefer to use for governing the movements of the power-controller. This manipulator may be near to or far away from the power-controller, since their connection is dependent entirely upon electric currents. It is also obvious that this dependence solely upon electric circuits renders it possible to govern an indefinite number of power-controllers from one manipulator or to connect the whole system to any desired number of manipulators at will.

As preferably constructed, my manipulator comprises an engagement-switch, a brush-selector, a magnet-selector, and an operator or handle. These are all the parts that are essential for the best governing of the power-controller. When used in connection with a current-director hereinafter described and with a controlling-actuator running in unison with the motor controlled, other features hereinafter described are added.

The engagement-switch coöperates with the engagement-interrupter in the power-controller where made as heretofore described or otherwise. In the form shown in the drawing it comprises a pivoted lever 13, carrying the brush or brushes 15 and 14, whereby the engagement of the levers 6 and 7, or one of them, with the controlling-actuator is governed. Where, as in the form shown, it is desired to make reverse movements of the levers 6 and 7, I prefer to use two brushes on the lever 13, as shown at 14 and 15, although my invention would cover the use of such brushes mounted separately from the lever 13. These brushes are insulated from one another. The brush 14 rides over the stationary contacts $A\ b'\ c'$, and the brush 15 rides over contacts $b^2\ c^2\ D$. The brush 14 is intended for use during movement of the lever 13 downward, and brush 15 is operative when the lever 13 moves upward. In order to accomplish this shifting of operation at the proper time, I provide the "brush-selector" heretofore mentioned, the function of which is to select the proper brush 14 15 during a given direction of movement of the lever 13.

While I have shown in the drawing two sets of stationary contacts, to each of which is appropriated a separate brush on the lever 13, it is to be understood that my invention would include as well a single brush on the lever 13 and a "selector" for shifting said brush on a pivot or otherwise from one set of contacts A to $c'$ over to the other set $b'$ to D, or vice versa. The term "brush-selector" is to be interpreted, when not otherwise limited, as broad enough to cover both these constructions. In the form shown in the drawing, however, the brush-selector comprises the lever 16, mounted on a pivot 17 on the lever 13 and having attached thereto any means for slightly resisting movement, such as the friction device or dash-pot 18. The metallic abutments 19 and 20, mounted on the brushes 14 and 15, respectively, or otherwise in electrical connection therewith, complete the brush-selector, as shown. The electrical contact made at the two abutments 19 and 20 may be of any well-known character, and it is to be understood in regard to these, as to all the movable contacts shown in the drawing, that they are merely diagrammatic representations typical of any well-known form of contact maker and breaker.

The contacts $A\ b'\ c'$ must be so arranged that as the brush 14 moves downward with the lever 13 it first touches A, which is connected by a wire to contact $a$ in the engagement-interrupter near the motor. The contact $b'$ is next touched, and this is permanently connected, as shown, to contact $b$ in the engagement-interrupter. Next the contact $c'$ is touched, and this is permanently connected with the contact $c$, as shown. If more changes of speed or power were desired, the same principle would be carried out, there always being one less contact under the brush 14 than the total number of contacts in the engagement-interrupter, and the last contact of the engagement-interrupter having no corresponding contact under brush 14.

The contacts $b^2\ c^2\ D$ under brush 15, on the contrary, are connected, as shown, in the reverse direction, the contact D corresponding to contact $d$ in the engagement-interrupter and there being no contact corresponding to contact $a$ in the engagement-interrupter. At the same time the arrangement of the contacts D $c^2\ b^2$ is such that in moving upward the brush 15 touches D first and the others in order.

As has already been explained, engagement by means of one of the magnets 11 12 produces movement of the regulator-arm 2 in one direction for a given direction of rotation of the disk 4 and engagement by means of the other magnet produces the opposite movement of the arm 2. It therefore becomes necessary to provide means whereby the proper magnet may be energized for production of movement of the regulator in the direction desired. This necessity arises whether the disk 4 is moved by the motor controlled or by an auxiliary motor.

In the case shown, however, where the motor controlled moves the controlling-actuator disk 4, it is further necessary that the selection of the proper magnet for a given direction of movement of the arm 2 must be opposite for opposite directions of motor movement.

In the preferred form of device shown the operator-handle and magnet-selector have been so arranged as to make these conditions consistent with natural and logical movements of the motorman's hand. My invention is broad enough, however, to cover any arrangement combining the magnet-selector with the manipulator in the combinations claimed whatever the specific construction thereof.

As shown in the drawing, the operator or handle 21 is T-shaped, the longer arm of the T serving as the handle-bar, which is kept in the middle position shown when the motor is at rest. This T-shaped lever is mounted rigidly upon a rotary pivot 22, with which it may be made to turn, and upon the same pivot is carried the shifting bar 23 of the magnet-selector. This shifting bar is arranged to make frictional engagement with the pivot or axis 22—as, for instance, by means of the split end, (shown in dotted lines at 24,) which end embraces the pivot.

The free end of the shifting bar 23 plays between the two contact-points 25 and 26, by contact with which it makes electrical connection with the wires 27 and 28, leading to the magnets 12 and 11, respectively. The bar 23 is electrically connected to the battery 29 or other source of current, as by the wire 30 and lever 13 or otherwise, the other pole of said source of current being connected to the brush-selector 16, as shown.

In the form shown the peculiar mechanical connection between the lever 21 and the bar 23 insures making of contact at the point 25 when the lever is thrown to the right and at the point 26 when the lever is thrown to the left, and at the same time such contact at 25 26 does not impede further movement of the lever 21 in either direction, as such movement occurs at the mere expense of friction at the split end 24 of the bar 23. It will be seen that any small change of direction of movement of the operator-bar 21 will cause change of contact from the point 25 to 26, or vice versa.

Other details of construction whereby this relation of the movement of the bar 23 and the operator 21 may be attained might be devised; but my invention is broad enough to cover any magnet-selector whereby in the combinations as hereinafter claimed change of contact from 25 to 26, or vice versa, takes place on movement one way or the other of the operator 21 and wherein lost motion is permitted.

In order to secure proper coöperation of the engagement-switch with the operator and magnet-selector, the lever 13 is actuated by means of links 31 and 32, pivoted to the bar, at 33, and engaging with pins 34 and 35 on the short arms of the T-shaped lever 21, as shown, in such a manner as to transmit downward thrusts, but not to transmit upward pulls from said pins to said lever 13. It will be evident that with this construction movement of the operator-lever 21 in either direction will cause downward movement of the lever 13, the latter returning to the position shown when the lever returns to its middle position under the influence of a spring 36 or otherwise.

It is clear that the T-lever 21 might be placed higher in relation to the lever 13, so that the normal positions of the pins 34 and 35 would be in the upper ends of the slots in the links 31 and 32. The T-lever would in that case act by pulling instead of pushing the lever 13. Such a construction is an obvious equivalent of the form already described.

The construction thus far described is sufficient to accomplish all the purposes of power regulation as distinguished from power direction and inauguration—such as is accomplished, for instance, by a main circuit-breaker and a reversing-switch for electric motors. The construction thus far described may be used with any kind of motor in connection with any means for starting the same and reversing it, if desired. This construction is particularly well adapted to the needs of electric motors of all kinds, however, and I have shown in the drawing one preferred form of power-director, whereby the same agency acts to make the circuit and to reverse the same or direct it in the desired path. It is to be understood, however, that I am not limited to the form shown in connection with the remainder of my construction. It is also clear that where an auxiliary motor runs the disk 4 the circuit-closer 61, hereinafter described, will not be necessary.

In the drawing, 37 and 38 are two solenoids having a common connection with one pole of the battery or other current source 39, the opposite pole of which is connected by the wire 46 to the operator or handle 21. The other ends of the solenoid-coils are connected by wires 40 and 41, respectively, to terminals 42 and 43. These terminals are so placed as to make constant contact with the lever 21 when the same is pressed to one or the other side of the central position.

The solenoids 37 and 38 control the armatures 44 and 45, respectively, the outer ends of which are pivotally connected to the ends of the lever 47, which turns loosely on the shaft 48. The depending arm 49 plays between two pins or projections 50 51 on the face of the disk 52, which is also mounted on the shaft 48. This disk carries the strips 53 and 54, upon which bear the terminals 55 and 56. The strips are insulated from each other, as indicated. The solenoids and their armatures coöperate with the disk and lever to form a reversing device, since depression of either side of the lever 47 by means of a solenoid causes the arm 49 to impinge upon a corresponding pin 50 or 51, and thus force the disk around from the position shown in full lines to that indicated by the dotted-line position of the pins and of the insulation between the strips 53 and 54, or vice versa.

In order to automatically connect the reversal of circuits with the proper make and break of the current and to so arrange the order of operations that the reversal shall always take place with open circuit, I have devised the form of circuit maker and breaker shown in the drawing. It is to be understood, however, that my invention is broad enough to cover the combination of the reverser shown with any form of circuit maker and breaker.

In the drawing the line-current is brought in at the point 57 to the switch-lever 58, pivoted, as at 59, and kept in open-circuit position by means of the spring 60. This lever commands the jaws of the maker and breaker, which may be of any desired construction, but is shown typically at 61.

The lever 58 is operatively connected to the two ends of the lever 47 by means of the links 62 and 63, arranged as shown, so that the solenoids may act to pull upon the lever whichever way they move the arm 47, but so as to allow lost motion in either link when idle. One advantage of the construction shown is that on the opening of the circuit the lever 58 brings 47 to a middle position with a positive action that admits of no vibration. It is evident that whichever solenoid is energized and whichever way the current is directed by the reverser the circuit will be made at the point 61.

As in the case of the manipulator, the links 62 63 may obviously be arranged to push the lever 58 instead of pulling the same.

As shown in the drawing, the solenoid 37 was the last to operate, and upon the lever 47 returning to its middle position shown the arm 49 simply came against pin 50 without moving it, but in readiness to operate the reverser whenever solenoid 38 is energized. Supposing now that current is sent through solenoid 38, the arm 49 will press upon pin 50 and throw the disk into the position indicated by the dotted pins, at the same time depressing the lever 58. The break at 61 should, however, be made so wide, as compared to the necessary throw of the reverser-disk 52, that this reversing operation may be accomplished before the break 61 is closed.

The current-director described may be operatively connected with the motor to be started in many ways more or less obvious to those skilled in the art. I have shown one well-known way, which I shall proceed to describe.

The stationary jaw at 61 is connected electrically to the strip 53, as shown, and also by the wire 64 to one terminal 65 of the motor field-magnet. The other field-magnet terminal 66 connects by the wire 67 with the binding-screw 68 of the variable resistance 1, and the opposite binding-screw 69 of the resistance is connected with the outgoing wire 70 to the line.

The brush 71 is connected by wire 73 to the terminal 55, and brush 72 is connected by wire 74 to the opposite terminal 56. The wire 75 connects the strip 54 on the reverser to the outgoing end of the line.

It will now be possible to describe the mode of operation of all the parts the construction of which has been heretofore described, supposing it to be desired to start the motor in the direction of the arrow shown in full lines and to regulate its speed during revolution in this direction. Suppose the lever 21 to be thrown to the right, so as to make contact with the terminal 42. Circuit will thus be made through the solenoid 37, and the disk 52 will be thrown into the position shown in the drawing, if not already in that position. At the next moment and by virtue of operation of the same solenoid the break at 61 will be closed and the circuit will be completed through the motor, one branch proceeding from the jaw 61 to field-magnet by wire 64, thence to resistance-box by wire 67, and thence to line, the other branch of the current passing by strip 53, brush 55, wire 73, and brush 71 to the armature, and thence by brush 72, wire 74, brush 56, and strip 54 to the line at 70. The motor will then start, as indicated by the arrow, and the controlling actuator-disk 4 will turn in unison therewith. At the same time the movement of the lever 21 will act through link 32 to move the engagement-switch, and the contact-selector lever 16 will be forced against the abutment 19 by the mechanical resistance 18. The magnet-selector bar 23 will simultaneously make contact at 25.

As soon as brush 14 touches the strip A circuit will be closed as follows: from battery 29, wire 30, contact 25, wire 27, magnet 12, arms 7 and 6, contact $a$, contact A, brush 14, abutment 19, lever 16, and back to battery. The magnet 12 thus energized will be carried around by the rotating disk, and with it the motive levers 6 and 7, actuating the arm 2 of the resistance-changer 1 through the medium of the connecting-bars 8 and 9. This movement will continue until the magnet is deënergized, which in the form of device shown occurs when the contact at the end of the lever 6 leaves the stationary contact $a$. The construction is such that this can only happen when contact is made with the contact $b$ of the engagement-interrupter.

As long as no further depression of the lever 13 takes place the motor will run at the speed corresponding to the position of the arm 2 assumed when the motive lever 6 is over contact $b$; but if greater speed or power is desired the lever 13 is further depressed until the brush 14 comes in contact with the strip $b'$, when again the magnet 12 will be energized and a further movement of the arm 2 take place until the contact at the end of the motive lever 6 comes over the contact c. The same operation can be applied to any desired number of contacts for as fine an adjustment of speed as desired.

It is to be observed that my device provides for moving the regulator back and forth to any practical extent as often as desired without breaking the circuit at 21 and 42 by returning the operator to middle position. Supposing, for instance, that the lever 21 were half-way between the position shown and the extreme right-hand position and supposing that the motor has been gradually speeded up, it is now desired to lower the speed. The lever is simply moved back toward the middle position, and the following actions take place. The bar 23 of the magnet-selector will make contact now with 26, and the resistance 18 will cause the bar 16 of the brush-selector to lag back against the abutment 20, thus bringing brush 15 into circuit with the battery 29.

The effect of changing the contact from 25 to 26 is to substitute magnet 11 for magnet 12 and cause the same movement of the disk 4, which has not changed its direction of rotation, to reverse the movement of the motive levers 6 and 7 and the arm 2 of the resistance-changer. At the same time bringing brush 15 instead of brush 14 into circuit advances the current in the order of engagement-interrupting contacts $a\ b\ c\ d$ and closes the circuit at once upon what had been a dead-contact in that series. For instance, if the brush 14 had been on A and $b'$ together when the reverse movement of the lever 21 occurred the brush 15 would have been found on D and $c^2$. The motive lever 6 would have been over contact $c$, and consequently the moment the lever 16 throws 15 into circuit the magnet 11 would be energized through wire 28, contact $c$, contact $c^2$, and by brush 15 to battery. The reverse movement of the levers 6 and 7 would break this circuit when the lever 6 came over $b$, and if the upward movement of the lever 13 were continued the magnet 11 would be again energized through contacts $b$ and $b^2$, so as to throw the end of lever 6 over to contact $a$ in readiness for operation when the lever was again thrown from its center.

It will be further observed that during regulative movement to any extent in either direction of the lever 21 over the long terminal 42 the solenoid 37 will remain energized and the current through the motor will be maintained.

Supposing now that the lever 21 is thrown to the left instead of to the right from the middle position, the first result will be the energizing of the solenoid 38 by current passing from battery or other current source at 39 through solenoid 38, wire 41, terminal 43, lever 21, and wire 46 to 39. The arm 49 will now throw the pins 50 and 51 into the position indicated in dotted lines and the disk 52 will be turned so as to change the direction of current through the armature of the motor 5. At the next moment the jaw 61 will close and current will pass through the field-magnets, as before, through wire 64, terminals 65 and 66, and wire 67. The current through the armature will pass from 61 first to strip 53 and terminal brush 56 and therefore in the direction opposite to that taken in the position heretofore described. The motor 5 and disk 4 will therefore turn in a direction opposed to the arrow. At the same time movement of the magnet-selector bar 23 downward will reverse the relation of magnet selection to brush selection at 16—that is to say, whereas in the operation heretofore described the circuit was closed at 25 when the brushes 14 and 15 moved downward in the new operation the circuit will be closed at 26, and therefore through magnet 11, when brushes 14 and 15 move downward.

Inspection of the drawing will show that this is the necessary condition for the case of movement of the disk 4 against the arrow and that by these means downward movement of the lever 13 is made to always correspond to movement of the power-regulator arm 2 in the direction of the arrow for cutting out resistance or otherwise increasing power.

It will be clear from the foregoing that my improved system reduces to its utmost simplicity the problem of manipulation presented to the motorman. To stop the motor, the lever 21 must be brought to its middle position. To go forward, move the lever forward, and the farther forward the lever is moved the greater will be the forward power of the motor. On the other hand, backward movement corresponds to backward inclination of the lever 21, and the extent of power is regulated in the same way as before. The position of the lever on either side determines absolutely the degree of power turned on.

The specific arrangement of contacts A to D under the brushes 14 and 15 is not necessary to the mode of operation which is above described. As long as these contacts are so arranged as to be successively touched by the brushes 14 and 15 in the relative order named the operation can be carried out; but the overlapping of these contacts, as shown, and the relative lengths illustrated possess a great advantage in practice.

In many cases it is desirable to throw the lever directly over to the speed desired without waiting for intermediate speeds. If the contacts A $b'$ $c'$ did not overlap, it is conceivable that the lever could be thrown so fast that the brush 14, for instance, would get ahead of the contact on the lever 6 instead of lagging behind it. In this case the magnet 11 or 12 would get no current and the motor would not speed up.

In the form as shown, however, contact cannot be made with $b'$ without being also maintained with A, nor can contact be made with $c'$ without being maintained with $b'$. Supposing, therefore, that the lever 21 were thrown suddenly to the right as far as it would go, the brush 14 would be making contact with all three contacts A $b'$ $c'$ and the magnet 12 would be energized until the disk 4 had moved the contact at the end of the lever 6 all the way over to contact $d$, which corresponds to the highest speed. It will be seen that the same advantage is obtained with the contacts arranged, as shown, under the brush 15. The advantages incident to this use of overlapping stationary contacts at the manipulator can be obtained by use of a variety of electrical equivalents, and it is to be understood that my invention covers in this connection electrical continuity of action, however produced mechanically. It is also clear that since the contacts $a$, $b$, $c$, and $d$ are permanently connected to appropriate terminals at the manipulator this electrical overlapping may be produced as well near the controlling-actuator as in the manipulator. There results from this arrangement the further advantage that adjustment of the maximum of suddenness of start may be obtained and the motorman thus be prevented from burning out the fuses or producing uncomfortable starts and stops.

I prefer to accomplish this by merely attaching an adjustable mechanical resistance to the arm 2 of the power-controller—such, for instance, as the dash-pot 75$^a$—the speed of which is governed by the well-known valve-adjustment screw 76. Any other well-known form of mechanical resistance may be used in this connection. With this equipment the motorman may be permitted in starting to always throw his lever 21 as far as is necessary for getting the maximum speed desired. The disk 4 will start, but the magnets 11 and 12 will always slip to the extent necessary to permit movement of the arm 2, according to the law of the adjustment of the mechanical resistance 75$^a$. At the same time it is evident that slower speeding up is always within the power of the motorman, since he may throw his lever as short a distance as he pleases.

Another auxiliary device which may be useful in preventing danger from carelessness of motormen is seen in the locking device at 77. The pivoted lever 77 carries a stop 78, adapted to fall in the path of the pin 79 at the lower end of the lever 21. When the lever 13 is in its highest position, corresponding to the middle position of the lever 21, the locking-lever 77 is so supported, as at the point 80, that the stop 78 hangs clear of the pin 79. At all other times the stop 78 will prevent the pin 79 from passing it. This construction will therefore prevent the motorman from recklessly jerking the lever from full-speed position at one side to reverse full speed and will insure movement of the lever 13 to its top position in all cases before it can be thrown downward again, since until such top position is reached the pin 79 and stop 78 prevent reversal of the lever 21.

It will be evident that some features of the construction which I have described will be adapted to the transmission of movement to a distance for any and all purposes, and they are so claimed herein.

What I claim is—

1. A power-regulator, a controlling-actuator, an electromagnetic engager adapted to cause engagement between said regulator and actuator, electric circuits for energizing said engager, an engagement-interrupter moving with said engager for controlling said circuits at one set of terminals and a manipulator for controlling said circuits at another set of terminals.

2. In means for controlling motors, a power-regulator, a controlling-actuator, an engager adapted to cause frictional engagement between said regulator and said actuator, means for automatically interrupting said engagement and an adjustable retarding device attached to said regulator.

3. In means for controlling electric motors, a power-regulator, a controlling-actuator, an electromagnetic engager adapted to cause engagement between said regulator and actuator, electric circuits for energizing said engager, circuits for energizing the motor to be governed, an electromagnetic current-director for said motor-circuits, and a manipulator for simultaneously controlling said engager and said current-director.

4. In means for producing controlled movements at a distance, an engagement-interrupting switch, an engagement-producing switch having terminals connected to appropriate terminals in said engagement-interrupting switch, one or more brushes moving over the terminals of the engagement-producing switch, and means for keeping one terminal of the interrupting-switch in circuit after the brush has reached the next corresponding terminal in the engagement-producing switch.

5. A rotary disk, one or more electromagnets adapted when energized to be attracted to said disk, a circuit for energizing said magnet or magnets and a switch in said circuit actuated by movement of said magnet or magnets.

6. As a means for controlling mechanical movement, a disk adapted to revolve, an electromagnet adapted when energized to be attracted to said disk, a circuit for energizing said magnet, a switch actuated by movement of said magnet and means for completing the energizing-circuit through the stationary contacts of said switch successively.

7. A rotary disk and an electromagnet pivotally mounted in front of said disk and adapted when energized to be attracted to said disk; in combination with a contact moving with said magnet and electrically connected with the coils of said magnet, a series of stationary contacts in the path of movement of said movable contact, and means for completing the magnet-circuit through said stationary contacts successively.

8. As a means for converting rotary movement in one direction into corresponding movements in opposite directions at will, a rotary disk, two motive levers mounted upon a common pivot in front of said disk, two connecting-bars pivoted at the point of reverse movement and extending respectively to pivots at the extremities of said motive levers, an electromagnet on each of said motive levers adapted when energized to be attracted to said disk, and means for energizing one or the other of said magnets at will.

9. As a means for controlling successive electrical engagements, a series of stationary electric contacts near the point of engagement, a second series of stationary contacts near the point of control, one of which is in circuit with one of the extreme contacts of said first series, the others being in circuit with the intermediate contacts of said first series; and a third series of stationary contacts near the point of control one of which is in circuit with the opposite extreme contact of said first series, the others being in circuit with the intermediate contacts of said first series; in combination with a source of current, two brushes moving respectively over said second and third series of stationary contacts, and means for bringing one or the other movable contact in circuit with said source of current.

10. In a circuit-governing switch, two sets of stationary contacts, a pivoted lever moving over the same and carrying one end of the circuit to be governed; in combination with a brush-selector whereby the circuit end on said lever may be brought into electrical relation with one or the other set of stationary contacts.

11. In a circuit-governing switch, two sets of stationary contacts, and two brushes adapted to move together over said two sets of stationary contacts respectively; in combination with means for moving said brushes, and a switch operatively connected to said moving means for bringing one or the other of said movable brushes into the circuit to be governed.

12. In a switch, a pivoted lever, two insulated brushes carried thereby, a selecting-lever pivoted to said switch-lever, a circuit-making stop on each side of said selecting-lever connected respectively to said insulated brushes, and means tending to resist movement of said selecting-lever in unison with said switch-lever.

13. As a means for selecting and controlling electromagnetic engagement, two engaging magnets, an engagement-interrupter near said magnets, and an engagement-switch cooperating therewith; in combination with an operator for said engagement-switch, and an engagement-selector-closing circuit through one or the other of said engaging magnets when said operator is moved in one direction or the other at any point in its path of movement.

14. As a means for selecting and controlling electromagnetic engagement, two engaging magnets, an engagement-interrupter near said magnets, and an engagement-switch cooperating therewith; in combination with an operator adapted to produce similar movements of said engagement-switch on each side of a middle position, and an engagement-selector-closing circuit through one or the other of said engaging magnets when said operator is moved in one direction or the other at any point in its path of movement.

15. A pivoted switch-lever, a pivoted operator therefor, two links pivoted to said switch-lever and a pin on each side of the pivot of said operator engaging respectively with said links; in combination with a selecting-switch comprising a swinging contact-lever having a frictional support on the axis of said operator.

16. A pivoted switch-lever, a pivoted operator therefor, two links pivoted to said switch-lever, and a pin on each side of the pivot of said operator engaging respectively with the links; in combination with a selecting-switch comprising a swinging contact-lever actuated by said operator.

17. In a manipulator for control of mechanism at a distance involving alternate use of a plurality of magnets, a controlling-lever, a switch-lever movable thereby for operating electric connections extending to each of said magnets, and a magnet-selector for bringing one of said magnets at a time into said circuits.

18. In a manipulator for control of mechanism at a distance involving alternate use of two magnets, a controlling-lever, a switch movable thereby for operating electric connections extending to both of said magnets, and a magnet-selecting switch making frictional engagement with said controlling-lever so as to permit lost movement.

EDWIN R. GILL.

Witnesses:
HAROLD S. MACKAYE,
LEO SCHWAB.